Dec. 25, 1962   W. H. PODOLNY   3,070,703
SOLAR ENERGY POWERPLANT
Filed April 7. 1960   4 Sheets-Sheet 1

INVENTOR
WILLIAM H. PODOLNY
BY Charles A. Warren
ATTORNEY.

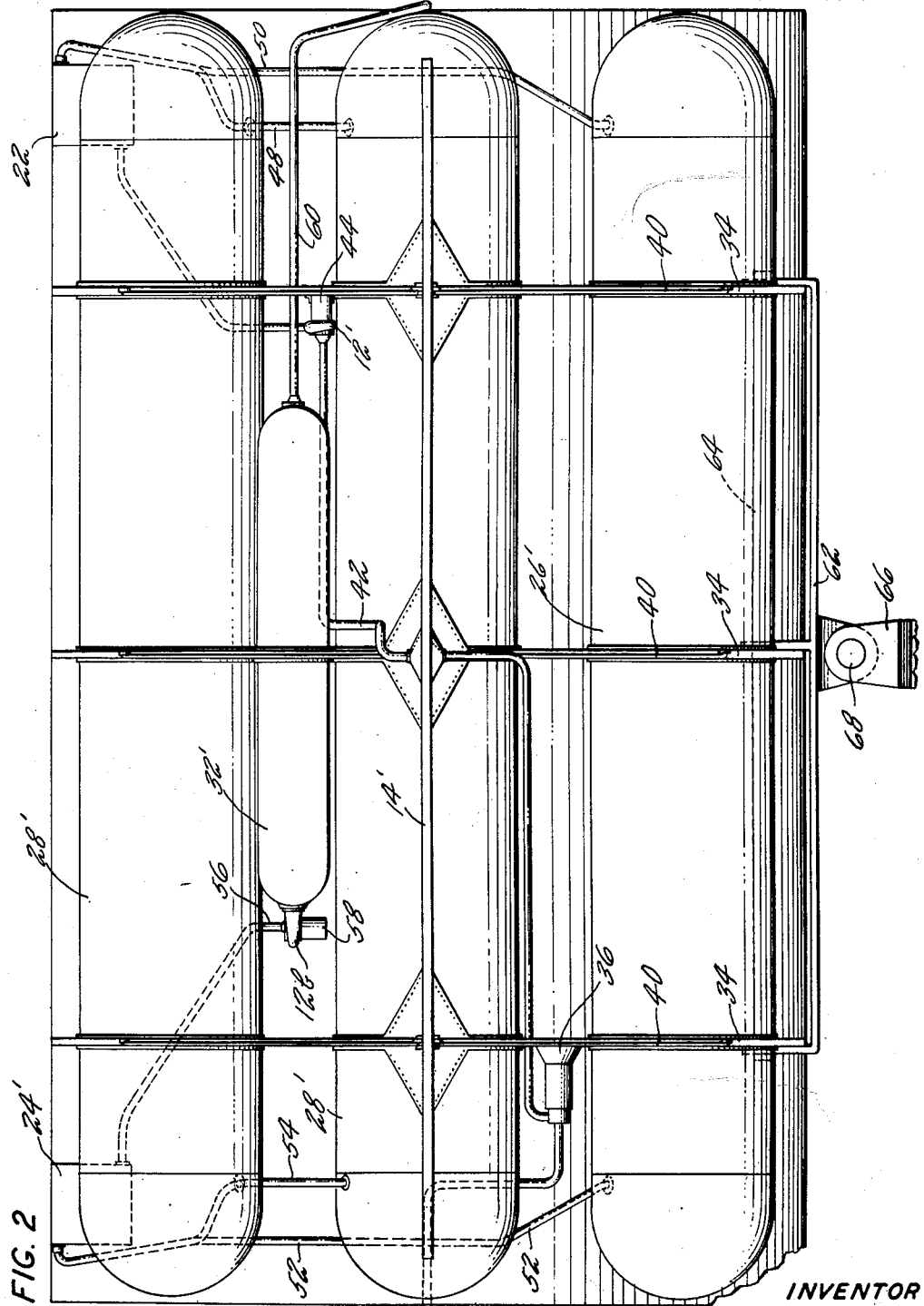

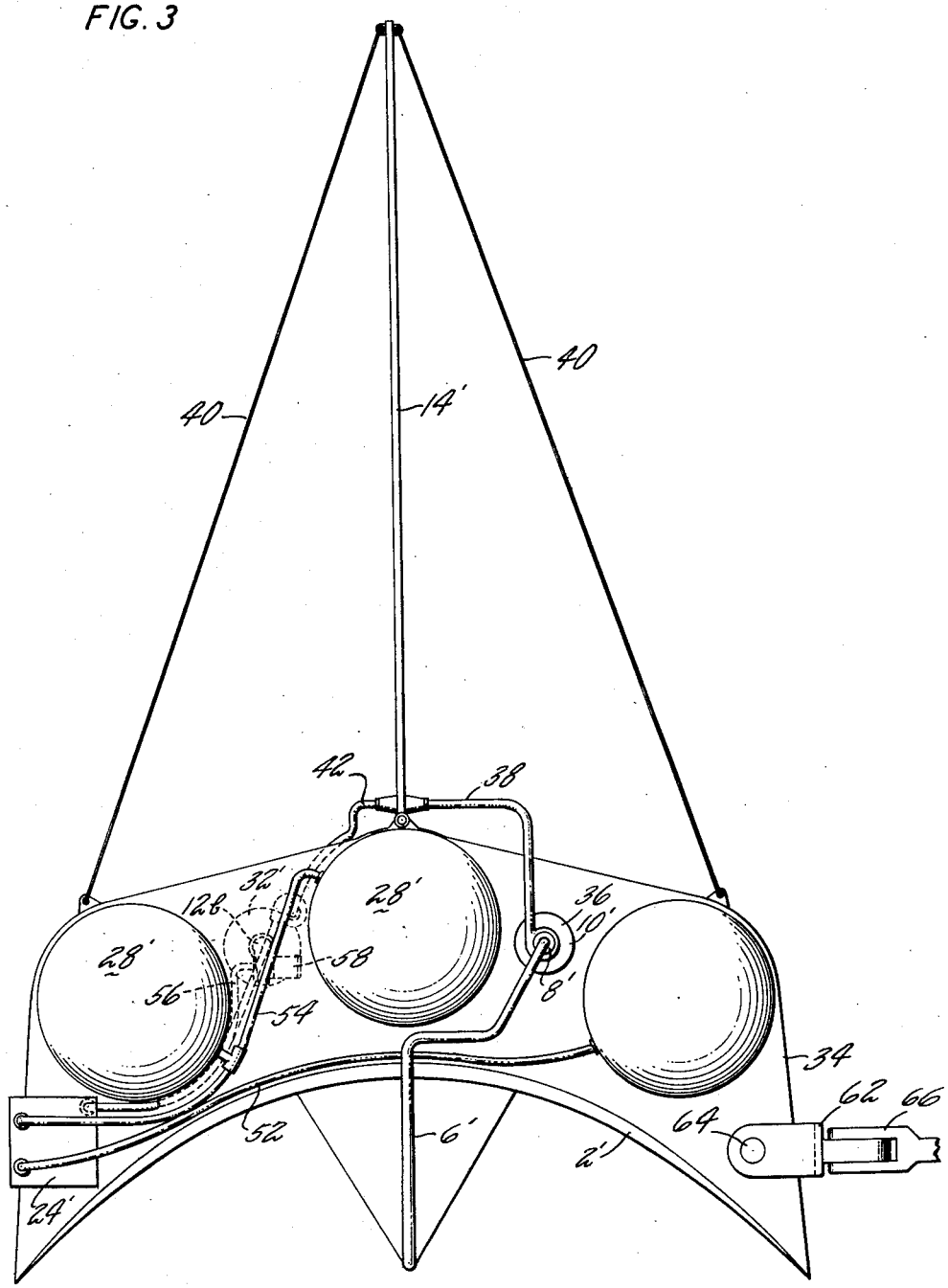

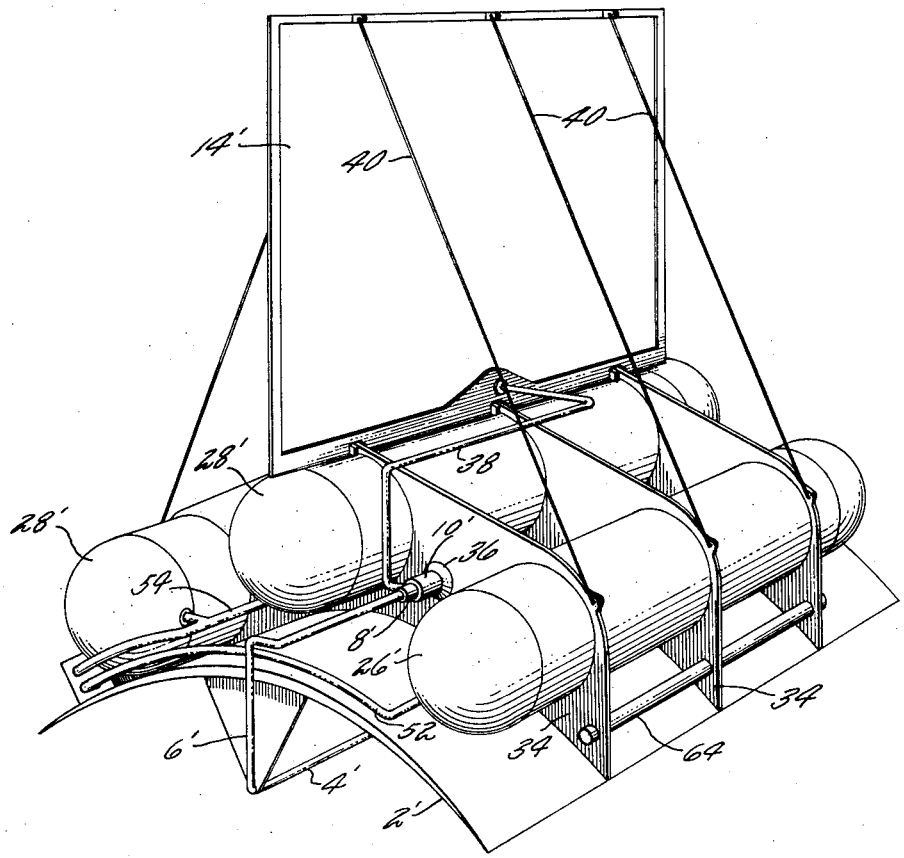

3,070,703
SOLAR ENERGY POWERPLANT
William H. Podolny, Manchester, Conn., assignor to United Aircraft Corporation, East Hartford, Conn., a corporation of Delaware
Filed Apr. 7, 1960, Ser. No. 20,739
12 Claims. (Cl. 290—2)

This invention relates to a solar energy powerplant and particularly to a powerplant adapted to supplying electrical energy whether or not the device is exposed to the sun.

One feature of the invention is an arrangement for storing some of the heat energy from the sun so that it may be utilized during the intervals when the device is not exposed to the radiant heat of the sun.

Another feature is the use in a powerplant of this type of a chemical compound which can be separated into its constituents electrically together with an arrangement for storing the constituents, to be later combined chemically for producing electrical energy for the powerplant. Another feature is the use of the same fluid as the electrolyte in the fuel cell and in the electrolyzer.

Other features and advantages will be apparent from the specification and claims, and from the accompanying drawings which illustrate an embodiment of the invention.

FIG. 2 is a plan view of a somewhat modified powerplant incorporating many of the features of FIG. 1.

FIG. 3 is an end view of the device of FIG. 2.

FIG. 4 is a perspective view of the powerplant.

Figure 1:
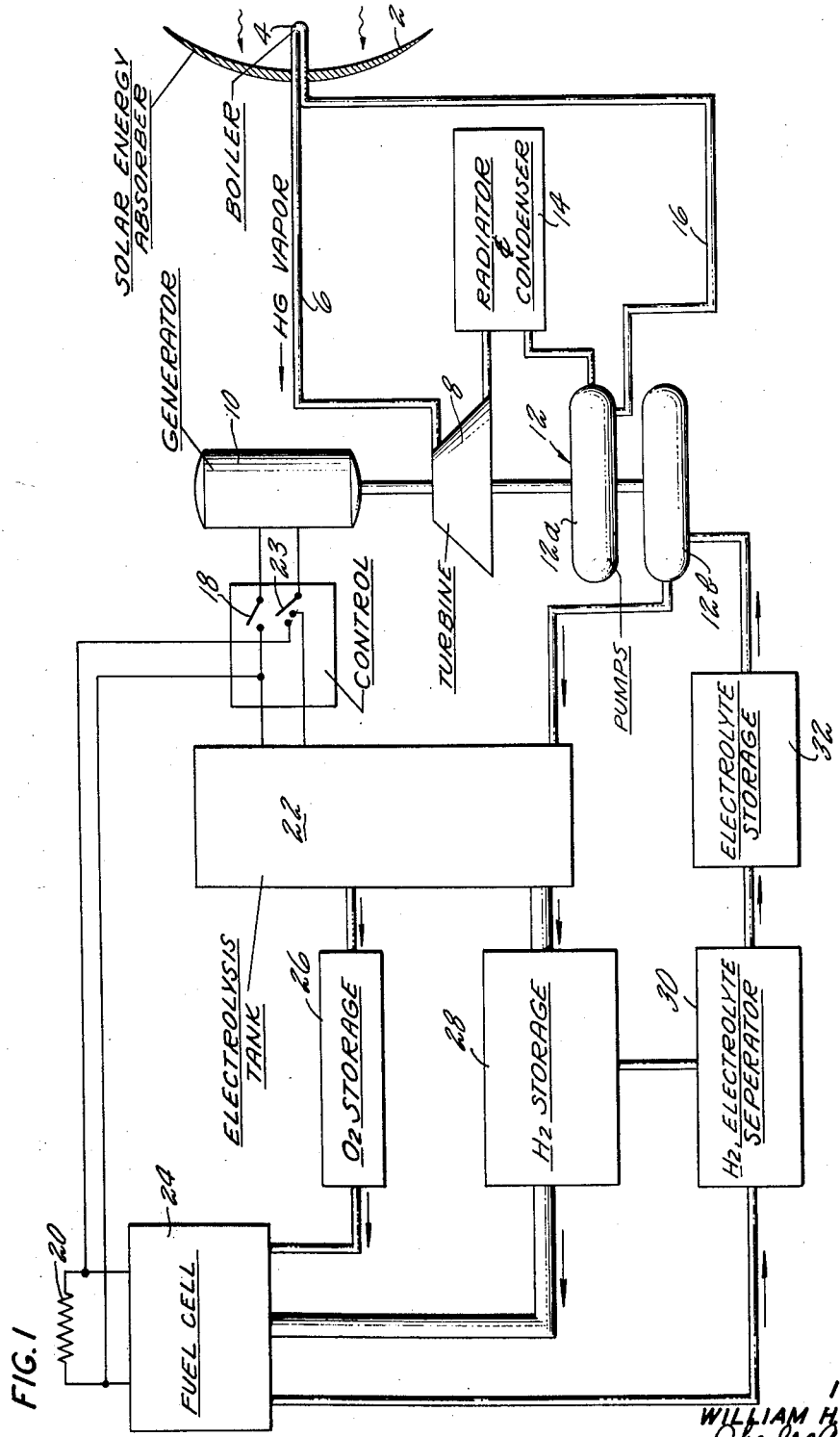
FIG. 1 is a diagrammatic view of a powerplant incorporated in the invention.

This powerplant is intended for use in space and in the arrangement shown it is adapted for use where there is little or no atmosphere. Its utility is not limited to this field, however, as will be apparent. Referring first to FIG. 1, the powerplant includes a parabolic mirror 2 having at its focus a boiler 4 so that the radiant energy from the sun is concentrated by the mirror onto the boiler. In the arrangement shown, the boiler is a mercury boiler and the mercury vapor is carried by a duct 6 to a turbine 8 which is driven by the expansion of the vapor and, in turn, drives a generator 10 and a pump assembly 12. The exhaust from the turbine 8 is delivered to a combined radiator and condenser 14 where the mercury vapor is cooled and condensed. The pump assembly 12 which may be dual pumps 12a and 12b then delivers the liquid mercury by pump 12a through a duct 16 to the boiler to be reheated.

The generator 10 is connected electrically to a control 18 which divides the electrical energy between an electrical load 20 and an electrolysis cell or electrolyzer 22. The control 18 incorporates a switch 23 by which the generator and cell 22 may be disconnected from the load 20 during those periods when the energy of the sun is not available for the powerplant.

For supplying electrical energy when the generator 10 is not operative a fuel cell 24 which produces energy by the chemical combining of the constituents of a chemical compound is utilized. The particular fuel cell shown utilizes hydrogen and oxygen as the constituents of the chemical compound, water, and the chemical combining of these two constituents in the fuel cell produces electricity for the load 20. One example of a fuel cell of this type is described in the Bacon Patent 2,716,670.

In the arrangement shown, oxygen from a storage tank 26 and hydrogen from a tank 28 are delivered to the fuel cell and in combining to form water produce the necessary electrical energy. In order that the cell may be electrically conductive the electrolyte therein may be a caustic solution of water and an hydroxide, such as potassium hydroxide, although in the drawing it is represented as water.

The use of an electrolyte of this type is particularly advantageous since the water formed by the combining of the hydrogen and oxygen in the fuel cell becomes a part of the electrolyte and is delivered to the electrolyzer 22 where hydrogen and oxygen are separately removed therefrom.

From the fuel cell the water (electrolyte) is pumped through a separator 30 which removes any excess hydrogen from the water and through the electrolyte storage tank 32 and is returned to the electrolysis cell 22. The pump 12b of the assembly 12 serves to pump the water (electrolyte) as described.

When the solar energy unit is operating, a part of the electrical energy from the generator 10 is used in the electrolysis cell for decomposing the water into its two constituents which are delivered separately to the storage tanks 26 and 28.

It may be desirable to operate the electrolyzer at a higher pressure than the fuel cell in order that the gaseous hydrogen and oxygen may be stored at a higher pressure. This is readily accomplished by suitable valving and by appropriate sizing of the electrolyte pump 12b.

In effect, the powerplant includes two cycles, one a power cycle and the other an energy storage cycle. The power cycle described may operate with a different energy storage cycle or alternatively the energy cycle may operate with a different type of power cycle. The power cycle produces an excess of energy during its operation, and this excess of energy is stored in the energy storage cycle, the energy storage being in the form of pressurized constituents of a chemical compound. When the power cycle is out of operation, the energy storage cycle produces the required energy for the load by chemical combination of the constituents.

A powerplant utilizing these two cycles is shown in FIGS. 2, 3 and 4. This powerplant differs from the diagram of FIG. 1 to the extent that the mercury system is replaced by a water system. The boiler, turbine and condenser system utilizes a part of the water supply from, and is integrated with the water system of the electrolysis cell and the fuel cell. The device shown in FIGS. 2, 3 and 4 also does not include the separator by which any excessive hydrogen is separated from the water (electrolyte) although such a device could be incorporated if it were desired.

Referring now to FIGS. 2, 3 and 4, the parabolic mirror 2' has the boiler 4' extending along the focus of this parabolic mirror. The back of the mirror carries a plurality of axially spaced flanges 34 which support the oxygen tank 26' and a pair of hydrogen tanks 28'. Steam from the boiler is delivered through the line 6' to the turbine 8' which drives directly the generator 10'. The turbine and generator are supported by a bracket 36 on one of the flanges 34. An exhaust duct 38 delivers the exhaust fluid from the turbine to the radiator and condenser 14' which in the arrangement shown in FIG. 2 is substantially a planar condenser supported on the flanges 34 and held in position as by guide wires 40. This condenser may be of any suitable form and is not described in detail.

From the condenser the condensed fluid, water, passes through a duct 42 to the pump 12'. This embodiment of the powerplant utilizes an electric motor 44 for driving the pump 12' instead of using a part of the energy from the turbine. It is understood that the motor 44 is powered by electrical energy from the generator, the electrical circuits not being shown. From the pump 12' the water is delivered to the electrolysis cell or tank 22. Here the chemical compound, water, is decomposed by electrolysis into its constituents $H_2$ and $O_2$. The hydrogen is delivered through a duct 48 to the hydrogen tank 28' and the oxygen is delivered by a duct 50 to the oxygen storage tank 26'.

At the opposite ends of the storage tanks, an oxygen duct 52 delivers oxygen to the fuel cell 24' and another duct 54 delivers hydrogen to the fuel cell. In this cell the chemical combination of the hydrogen and oxygen to form water produces electrical energy. From the fuel cell the water is pumped as by the pump 12b through a duct 56 to the water storage tank 32. The pump 12b in this modification is driven by an electric motor 58 rather than utilizing energy from the turbine as in FIG. 1. From the water storage tank water is delivered through a supply line 60 to the boiler.

It will be understood that this device is primarily adapted for use in outer space where the device will substantially be weightless. Accordingly, the device may be hung from a space vehicle as by a pivot plate 62 attached to the flanges 34 as by a pivot pin 64. The plate 62 is in turn connected to a bracket 66 on the space vehicle as by a pivot pin 68 at right angles to the pin 64. Any suitable mechanism not shown may be incorporated for moving the device on its pivotal supports so that the parabolic mirror will face directly toward the sun during those periods when the sun is visible from the vehicle.

In operation, so long as there is radiant energy from the sun available, this energy is concentrated onto the boiler by the mirror and the vapor formed in the boiler is used to drive the turbine 8' which in turn drives the generator 10'. A part of the electrical energy from the generator supplies the energy for the load and the remaining energy is used in the electrolysis cell for the decomposition of the chemical compound in the cell. The constituents of the compound are stored in the respective storage tanks 26' and 28'. During the time that the turbine 8' is in operation the exhaust vapor is cooled and condensed in the condenser 14 and the condensed liquid is then returned to the boiler.

When the radiant energy of the sun is not available the control 18 disconnects the load from the generator and the fuel cell 24 becomes operative to produce electrical energy for the load by the chemical combining of the constituents of the compound. The constituents are suppled from the storage tanks for these constituents. After the chemical compound has been formed in the fuel cell the compound is returned to the compound storage tank. When the sun's energy is again available the chemical compound is pumped from the storage tank to the electrolysis cell. Suitable valving will normally be provided on the inlets and outlets of the storage tanks 26 and 28 and these valves may be connected with the control system 18, if desired, for more nearly approaching automatic control of the entire cycle.

It is to be understood that the invention is not limited to the specific embodiment herein illustrated and described, but may be used in other ways without departure from its spirit as defined by the following claims.

I claim:

1. A solar energy powerplant including a boiler, a mirror for concentrating radiant heat on said boiler, a turbine powered by vapor under pressure from said boiler, and a generator driven by said turbine in combination with an electrolysis device for separating a compound into its constituents, storage means for the constituents, a fuel cell in which said constituents are combined to produce electrical energy, and control means for selectively connecting said generator to said electrolysis device and to a load or connecting said fuel cell to the load.

2. A powerplant as in claim 1 in which the boiler utilizes mercury for supplying vapor under pressure to the turbine.

3. A powerplant as in claim 1 in which the compound is water.

4. A powerplant as in claim 1 in which the compound is water and separate storage tanks are provided for hydrogen and oxygen from the electrolysis device.

5. A powerplant as in claim 1 in which pump means withdraws the compound from the fuel cell and delivers it to the electrolysis device.

6. A powerplant as in claim 5 in which the pump is driven by said turbine.

7. In a solar energy powerplant, a power generator circuit including a boiler, a mirror for concentrating solar heat on said boiler, a turbine driven by vapor from said boiler, a condenser to which the turbine exhaust is discharged, a pump for returning the condensed fluid from said condenser to said boiler, a generator driven by the turbine and providing electrical power and a power storage unit including an electrically energized device for separating a chemical compound into its constituents, a storage means for each of said constituents, a device for generating electrical energy by the combination of said constituents, and means for returning the combined constituents from said electrical generating means to the electrically energized device.

8. In a solar energy powerplant, a boiler, means for concentrating radiant heat on said boiler, a turbine driven by vapor from said boiler, a condenser into which the turbine exhaust is discharged, means for returning condensed fluid from said condenser to said boiler and a generator driven by the turbine for supplying electrical power, in combination with a power storage unit including an electrically energized device for separating a chemical compound into its constituents, a storage means for each of said constituents, and an electrical generating device for producing electrical energy by the direct combination of said constituents, fluid connections from said storage means to said electrical generating device, and a control for connecting said generator to said electrically energized device and to a load.

9. A powerplant as in claim 8 in which the load is also applied to the electrical generating device and in which said control selectively connects the load to the generator or to the electrical generating device.

10. A powerplant as in claim 8 in which the electrical generating device is a fuel cell, the load is also applied to the electrical generating device and in which said control selectively connects the load to the generator or to the electrical generating device.

11. A powerplant providing energy for a predetermined load, including a power cycle providing an excess of energy for the load, and an energy storage cycle for storing the excess of energy, said energy storage cycle including an electrolyzer, a fuel cell, and means for storing the products from the electrolyzer for use in the fuel cell when the power cycle is out of operation.

12. A powerplant as in claim 11 in which the electrolyzer and fuel cell each use an electrolyte and the electrolyte is pumped from the fuel cell to the electrolyzer.

References Cited in the file of this patent

UNITED STATES PATENTS

| | | |
|---|---|---|
| 2,716,670 | Bacon | Aug. 30, 1955 |
| 2,942,411 | Hutchings | June 28, 1960 |